United States Patent
Fellinger et al.

(10) Patent No.: US 7,358,328 B2
(45) Date of Patent: Apr. 15, 2008

(54) METHOD AND DEVICE FOR INCREASING THE INTRINSIC VISCOSITY OF POLYESTER MATERIAL BY MEANS OF SOLID PHASE POLYMERISATION

(75) Inventors: Markus Fellinger, Wilhering (AT); Christian Lovranich, Weissenbach (AT)

(73) Assignee: Starlinger & Co Gesellschaft m.b.H., Vienna (AT)

( * ) Notice: Subject to any disclaimer, the term of this patent is extended or adjusted under 35 U.S.C. 154(b) by 48 days.

(21) Appl. No.: 10/528,635

(22) PCT Filed: Sep. 25, 2003

(86) PCT No.: PCT/AT03/00284

§ 371 (c)(1), (2), (4) Date: Oct. 24, 2005

(87) PCT Pub. No.: WO2004/029130

PCT Pub. Date: Apr. 8, 2004

(65) Prior Publication Data

US 2006/0093533 A1   May 4, 2006

(30) Foreign Application Priority Data

Sep. 25, 2002   (AT) .............................. A 1433/2002

(51) Int. Cl.
*B32B 27/06*   (2006.01)

(52) U.S. Cl. .................. 528/480; 206/96; 206/139; 528/271; 528/272; 528/280; 528/286

(58) Field of Classification Search .................. 206/96, 206/139; 528/271, 272, 280, 286, 480
See application file for complete search history.

(56) References Cited

U.S. PATENT DOCUMENTS

| | | |
|---|---|---|
| 4,370,302 A | 1/1983 | Suzuoka et al. |
| 2002/0026030 A1 | 2/2002 | Duh |

*Primary Examiner*—Terressa Boykin
(74) *Attorney, Agent, or Firm*—Townsend and Townsend and Crew, LLP

(57) ABSTRACT

The invention relates to a process and a device for increasing the intrinsic viscosity of a polyester material by solid-state polymerization, wherein the polyester material is heat-treated in a heat treatment container (6), the polyester material being introduced into a preheating container (2) prior to being conveyed into the heat treatment container (6), in which preheating container it is heated to a heat treatment temperature of the heat treatment container (6) or to a temperature above that and is delivered to the heat treatment container (6) after having reached said temperature. The preheating container (2) is small in comparison with the heat treatment container (6) so that the relatively small amount of polyester material contained therein can quickly be heated to the intended temperature, thereby leading to a short residence time in the preheating container. After reaching the intended temperature, the entire content of the preheating container can be delivered all at once to the heat treatment container, whereupon the preheating container can be charged with fresh polyester material. Due to the short residence time, the preheating container is operable well in a discontinuous operation.

19 Claims, 4 Drawing Sheets

METHOD AND DEVICE FOR INCREASING THE INTRINSIC VISCOSITY OF POLYESTER MATERIAL BY MEANS OF SOLID PHASE POLYMERISATION

BACKGROUND OF THE INVENTION

The invention relates to a process and a device for increasing the intrinsic viscosity of a polyester material by solid-state polymerization, wherein the polyester material is heat-treated in a heat treatment container.

When producing high-molecular polyesters such as PET and PEN, for example, a behavior of polyester which is unique among synthetic materials is utilized, according to which behavior polycondensation of the polyester molecules occurs and hence the viscosity of the polyester is increased if the polyester remains under high temperatures and vacuum or under inert gas in order to prevent the oxidative degradation. This preparation of high-molecular polyesters from a low-molecular polyester starting material usually occurs via melt polymerization or solid-state polymerization or a combination of both processes.

In case of melt polymerization, a polyester melt is processed at temperatures of approx. 270° C. to 300° C. for about 30 minutes to 5 hours under a strong vacuum of approx. 1 mbar. This involves the drawback that, due to the high processing temperatures, the initially described oxidative degradation process of the polyester will take place which leads to yellow coloring and counteracts the polycondensation of the polyester. The intrinsic viscosity values achievable by melt polymerization are approximately in the range of 0.6 IV (=Intrinsic Viscosity).

In case of solid-state polymerization, the polyester melt is usually extruded through several dies, and subsequently the synthetic strands thereby formed are cooled in a water bath. After having solidified, the synthetic strands are granulated, i.e. cut into pellets. Due to the rapid cooling, the polyester is provided in the amorphous state. This is important since polyester materials which originally were transparent remain translucent in the amorphous state, whereas, if cooling is slow, the polyester assumes a crystalline state in which a material which originally was transparent changes its color to white. For further processing, the polyester granulate must be reheated, whereby the granulated bodies become agglutinated in the range of the crystallization temperature (80-120° C.). Therefore, the granulate is first supplied to a so-called crystallizer in which it is brought to a temperature above the crystallization temperature under vigorous stirring in order to regain the flowability of the granulated bodies for further treatment, which is of great importance for the conveyance and drying in a container without agitator. Moreover, the granulate, in its crystalline form, absorbs less moisture, thereby permitting shorter residence times during drying. The granulate is then fed into a solid-state polymerization container, also referred to as an SSP (solid-state polymerization) reactor or heat treatment container, wherein it is heated to approx. 220 to 250° C. and subsequently is left under those conditions for about 1-40 hours until the desired intrinsic viscosity has been reached.

The heating of the polyester granulate in the SSP reactor is carried out according to the prior art either by means of an inert gas stream (f.i. nitrogen) as a heat-transfer medium, which stream—which is heated outside of the reactor—passes through the reactor and the granulate located therein, thereby transferring its heat to the granulate, and subsequently is sucked off, or by means of heating elements in an evacuated reactor.

Heating by an inert gas stream involves the disadvantage that the employed technical gases (f.i. nitrogen) are expensive and therefore must be conducted in a closed circuit, also for reasons of environmental protection. The closed circuit also requires that costly cleaning devices for the inert gas stream must be provided in order to filter out toxic substances and impurities taken up from the granulate. The implementation of such a reactor therefore only pays off with huge plants having a throughput in the range of 20 tons of polyester granulate per day and more.

Heating the granulate in a container under vacuum involves disadvantages in that the vacuum is an excellent heat insulator and, due to this property, counteracts the heating of the granulate. Therefore, it is either necessary to provide extremely long residence times of the granulate in the container or, in case of heating via heating elements attached to the exterior of the container, to provide one or several agitators for mixing the granulate in the interior of the container, or to provide technically complex movable heating elements in the interior of the container, which serve simultaneously as mixing elements. All those constructional measures, however, give rise to technical problems such as the formation of dead spaces in which the granulate gets stuck, turning round of the granulate stream, non-uniform heating, high energy consumption, etc. and are undesirable also for cost reasons. For the above-mentioned reasons, a continuous charging of the heating container with granulate is rendered extremely difficult.

SUMMARY OF THE INVENTION

Therefore, it is an object of the present invention to provide a process and a device of the initially mentioned type, by means of which the above-described disadvantages of the prior art are alleviated or even eliminated.

In the process according to the invention, this is achieved in that the polyester material is introduced into a preheating container prior to being conveyed into the heat treatment container, in which preheating container it is heated to a heat treatment temperature of the heat treatment container or to a temperature above that, preferably to essentially the heat treatment temperature, and is delivered to the heat treatment container after having reached the temperature. Generally, the heat treatment temperature amounts to at least 180° C. The preheating container may be small in comparison with the heat treatment container so that the relatively small amount of polyester material contained therein can quickly be heated to the intended temperature, thereby leading to a short residence time in the preheating container. After reaching the intended temperature, the entire content of the preheating container can be delivered all at once, i.e. in batches, to the heat treatment container, whereupon the preheating container can be charged with fresh polyester material. Due to the short residence time, the preheating container is operable well in a discontinuous operation.

Due to cost advantages and in favor of a simpler construction in comparison to the above-described inert gas plants, the preheating container can be operated under vacuum, preferably at between 0.1 and 10 mbar, whereby the preheating container can be heated by convection heat since the preheating container is designed with the largest possible surfaces which are heated. The heating of the container surfaces may in turn be effected by electric heating rods or by a heat-transfer medium such as oil flowing through or around the container surfaces. This kind of heating provides the advantage that the preheating container, provided with appropriate slides or flaps, can at the same time be used as a sluice container for the heat treatment container in order to achieve the shortest possible residence time for the polyester under atmospheric oxygen, or in order to completely eliminate the atmospheric oxygen, respectively, beginning from a temperature of 160-180° C. A particularly suitable embodiment of the container comprises a preferably heated agitator in order to keep as uniform as possible, by continuous stirring, the temperature in the container and hence the thorough heating of the polyester.

It proves to be favorable in terms of design and costs if the preheating container is integral with the entrance area of the heat treatment container.

For the purpose of an advantageous implementation of the starting phase of the process according to the invention, it is provided that, at the outlet of the heat treatment container, the temperature of the polyester material is measured and the material is returned to the preheating container or the inlet of the heat treatment container if the temperature is insufficient. Should the reactor be at a standstill for a longer period of time so that the granulate contained therein will drop below the heat treatment temperature, it nevertheless is unnecessary to completely empty the heat treatment container and to extrude the discharged material again, but rather the polyester material is recycled until it reaches the required temperature at the outlet, whereby in this case it has also received the necessary residence time.

Since due to the necessary residence times in the preheating container and in the heat treatment container the throughput of the polyester material is lower than the usual granulation capacity of a granulation unit arranged upstream, it may turn out to be beneficial if, after its production, the granulate is split up to a plurality of preheating containers comprising downstream heat treatment containers, or is conveyed from one preheating container into several heat treatment containers, respectively, in order to reach a balanced ratio between the throughputs of the granulation unit and of the heat treatment containers.

Advantageously, the heat-treated polyester material, after having being discharged from the heat treatment container, can be delivered still in the heated state to an extruder or a melt-processing device, for example an injection-molding machine, so that optimal use is made of the heat stored in the material.

The device according to the invention for increasing the intrinsic viscosity of a polyester material by solid-state polymerization via a heat treatment in a heat treatment container is characterized in that the heat treatment container is preceded by a preheating container for heating the polyester material to a heat treatment temperature of the heat treatment container or to a temperature above that, preferably to essentially the heat treatment temperature. In the preheating container, the polyester material can be brought to the intended temperature in a far shorter amount of time than would be possible solely in the heat treatment container. Advantageously, a vacuum, preferably of between 0.1 and 10 mbar, can be applied to the preheating container, wherein the preheating container can be provided with a heated agitator for faster heating of the granulate contained therein. A discontinuous operation of the preheating container can be achieved if the latter is connected with the heat treatment container via a slide.

In order to avoid the known problems associated with inert gas cycles, in a preferred embodiment of the invention, a vacuum, preferably of between 0.1 and 10 mbar, can be applied to the heat treatment container. Such a plant is cost-efficient also in smaller and medium-sized installation sizes.

By means of the device according to the invention it is possible to operate the preheating container discontinuously, whereby only short residence times of the polyester material are necessary, however, while running the heat treatment container, which must contain the polyester material for the solid-state polymerization throughout a substantially longer residence time of 3-10 hours and more, in a continuous operation, since the material is introduced already at the intended heat treatment temperature. Since, in contrast to the prior art, a lower heating capacity of the heat treatment container is thus required (given that the granulate has to be kept merely at the charging temperature or slightly below that temperature without having to be heated any further), the heat treatment container may be provided with wall heating, hence avoiding any problems associated with dead spaces as a result of internal heating, or may even be an unheated, heat-insulated container.

The most simple design is achieved if the preheating container is integral with the entrance area of the heat treatment container. Furthermore, a temperature sensor for measuring the temperature of the polyester material and a conduit for returning the polyester material to the preheating container or the inlet of the heat treatment container can be provided at the outlet of the heat treatment container, with the polyester-material discharge stream being redirectable into the return conduit depending on its measured temperature.

In order to better adapt the device according to the invention to the throughput of granulation units which are arranged upstream, a plurality of preheating containers comprising downstream heat treatment containers or one preheating container comprising a plurality of downstream heat treatment containers is/are provided. In order to minimize heat losses, an extruder or a melt-processing device, for example an injection-molding machine, can in turn be arranged directly downstream of the heat treatment container.

The invention will now be described in further detail by way of non-limiting exemplary embodiments.

DESCRIPTION OF THE PREFERRED EMBODIMENTS

Figure 1:
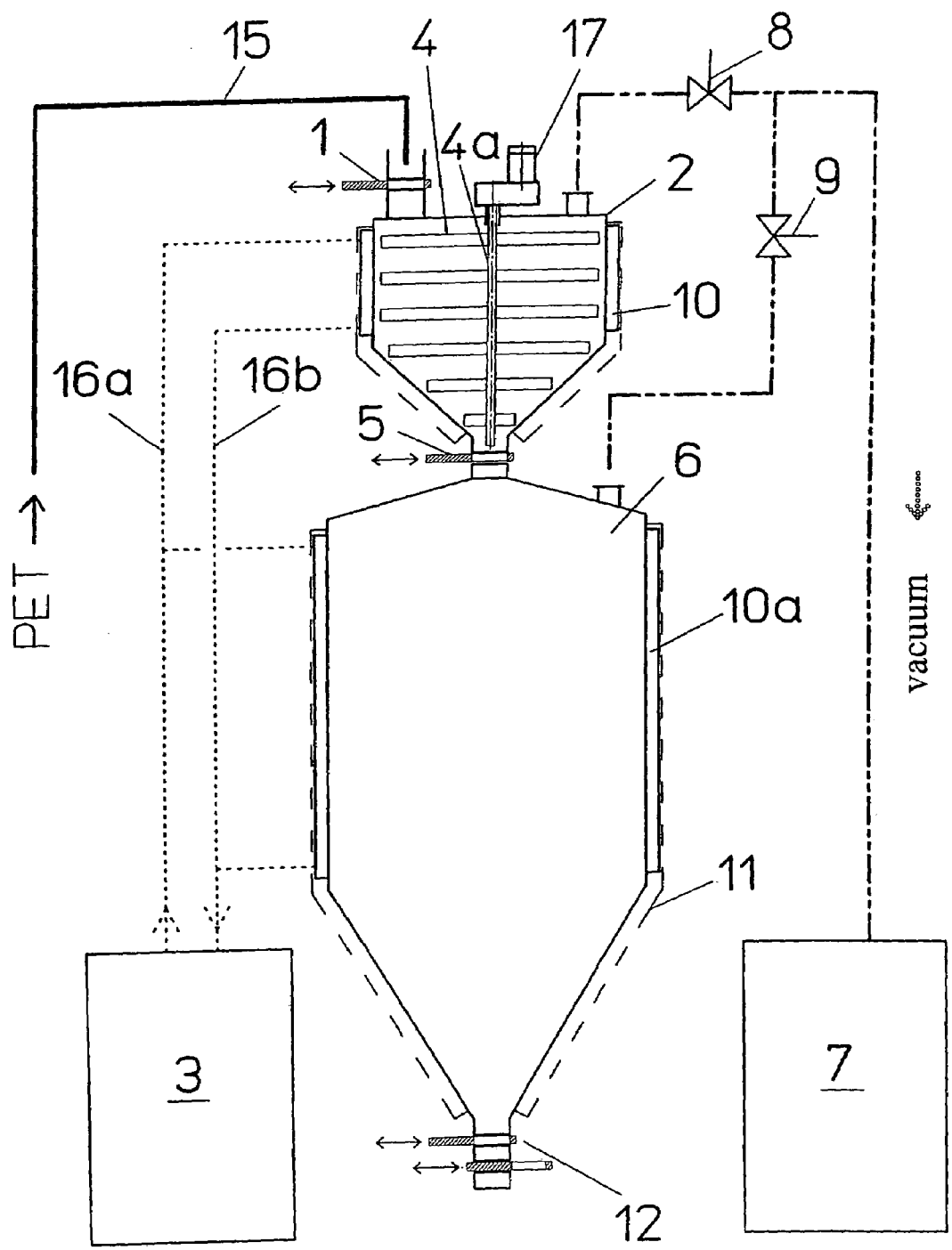
FIGS. 1 to 4 show four embodiments of the invention in schematic diagrams, wherein equal or similar components are provided with equal reference numerals and are illustrated only once in the subsequent specification.

FIG. 1 shows a first embodiment of the invention comprising a preheating container 2 having a vacuum-tight inlet flap 1 into which a conduit 15 for the supply of polyester material runs. The preheating container 2 has a double-walled design and is heated via a heating device 3 which heats a liquid heat-transfer medium (oil, water) that is introduced through heat-supply conduits 16a into the interspace (wall heating 10) of the double walls of the preheating container 2 and is returned via drains 16b to the heating device 3 after having given off its heat. In addition, the preheating container 2 is heated from the inside by an agitator 4 heated via a rotary transmission leadthrough 4a. The agitator 4 is driven by a motor 17. An outlet slide 5 establishes a lockable connection between the outlet of the preheating container 2 and the actual heat treatment container 6. Via a vacuum unit 7, both containers are evacuated independently by valve controls 8 and 9. The heat treatment container 6 is only provided with a wall heating system 10a in which a heat-transfer medium circulates from the heating device 3 via the supply and return conduits 16a, 16b. The wall heating 10 is dimensioned such that a polyester material located in the interior of the container will be maintained at its heat treatment temperature but will not be heated to higher temperatures. The heat treatment container 6 is surrounded by heat insulation 11 in order to compensate for the heat radiation losses. At the discharge end, there is a twin sluice system 12 at the heat treatment container 6 in order to ensure a continuous vacuum in the heat treatment container while guaranteeing a continuous discharge of material. Instead of the discharge-end twin sluice system, a vacuum-tight cellular wheel feeder might also be used.

In an experimental setup, a heat treatment container having a volume of approx. 1000 liters was used, the volume of the preheating container arranged upstream amounting to approx. 40 liters.

The process according to the invention is carried out as follows in the device according to FIG. 1.

Via appropriate conveyor means such as a vacuum conveyor, a feed screw or conduit 15, the polyester material, f.i. PET, is conveyed via the open inlet flap 1 into the preheating container 2, which was preheated to a heat treatment temperature of 220° C. The outlet slide 5 of the preheating container 2 to the heat treatment container 6 is closed. The valve 8 of the vacuum unit 7 to the preheating container is closed, and the valve 9 of the vacuum unit 7 to the heat treatment container 6 is open so that only the heat treatment container 6 is evacuated. After filling the preheating container 2 with a charge of the polyester material, the inlet flap 1 and the vacuum valve 9 to the heat treatment container 6 are closed so that the generated vacuum is maintained in the heat treatment container. Thereupon, the vacuum valve 8 to the preheating container 2 is opened and the container is evacuated (preferably to below 5 mbar). Subsequently, the vacuum valve 9 to the heat treatment container 6 is reopened. The charge of polyester material introduced into the preheating container 2 is heated to the heat treatment temperature of approx. 220° C. After the polyester material has reached the desired temperature, the material charge is delivered under vacuum to the heat treatment container 6 by opening the outlet slide 5 until the content of the preheating container has completely entered the heat treatment container 6, whereupon the outlet slide 5 is closed and the preheating container can be filled with fresh polyester material. After reaching the desired residence time in the heat treatment container 6, polyester material is discharged from the heat treatment container 6 through the twin sluice system 12 according to the FIFO principle (first in first out) (in the experimental setup, the average discharge temperature of the material from the heat treatment container amounted to 212° C.).

Figure 2:
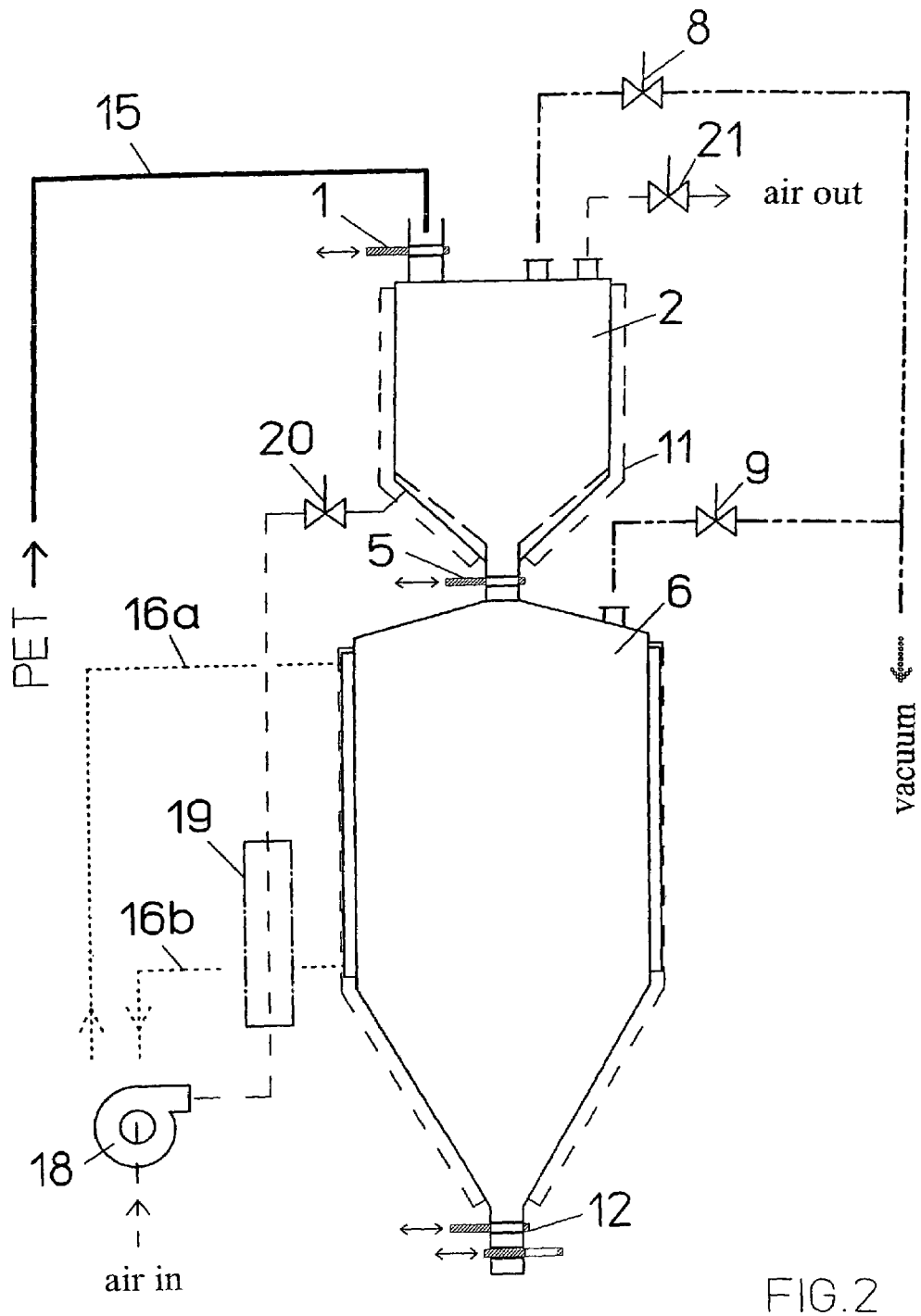

FIG. 2 schematically shows a somewhat simpler embodiment of the device illustrated above, wherein a slight oxidative degradation of the material (yellow coloring) in the preheating container is acceptable, which may be tolerable for recycling applications. The embodiment of FIG. 2 differs from that of FIG. 1 especially in that the preheating container 2 is provided neither with an agitator nor with a convection wall heating system. Instead of by the convection heat of the container surfaces, the polyester material in the preheating container 2 is heated by a heat-transfer medium, in the present case air. The air is drawn in through a fan 18 in the form of ambient air, is heated to the desired heat treatment temperature of f.i. 220° C. in an air heater 19, is supplied through an inlet valve 20 to the preheating container 2, is passed through the preheating container and hence through the polyester material located therein, and is sucked off via an outlet valve 21. Better heating of the polyester material might be achieved by nitrogen or dry air. Nevertheless, acceptable values were achieved also with this simple embodiment by heating the polyester material with ambient air.

Figure 3:
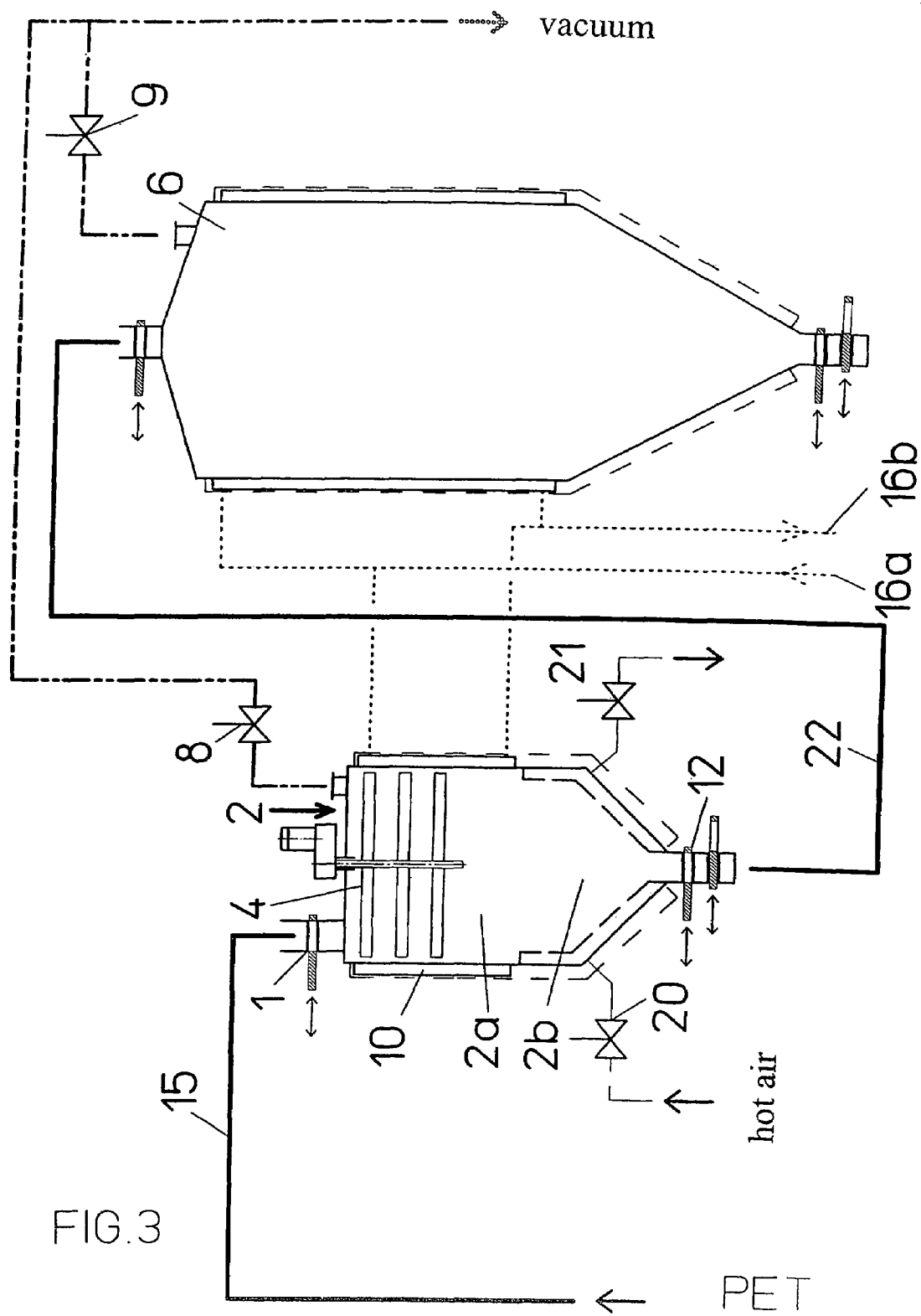

A further development of the embodiment of FIG. 2 comprising air heating of the preheating container is illustrated in FIG. 3. Thereby, the preheating container 2 is divided into two different temperature zones, whereby, in the upper zone 2a, a temperature of the introduced polyester material of f.i. 180° C. is achieved via a wall heating system 10 and a heated agitator 4, which temperature lies above the crystallization temperature of the polyester material. The heating in the upper area could also be effected by hot air. In the lower area of the preheating container 2, a temperature zone 2b of approx. 220° C. is created by supplying hot air through the inlet valve 20, with the hot air being sucked off on the opposite side through the outlet valve 21. The pretreated polyester material is discharged via the sluice system 12 and is supplied to the heat treatment container 6 via a vacuum-tight supply conduit 22. Thus, the preheating container functions as a crystallizer in which the polyester is heated to a temperature above the crystallization temperature in order to separate granulated polyester bodies stuck to each other, thus restoring the flowability of the grains for further treatment, which is of great importance for processing procedures taking place without agitator. Furthermore, the granulate, in its crystalline form, absorbs less moisture and also permits shorter residence times during drying (f.i. after previous washings).

Figure 4:
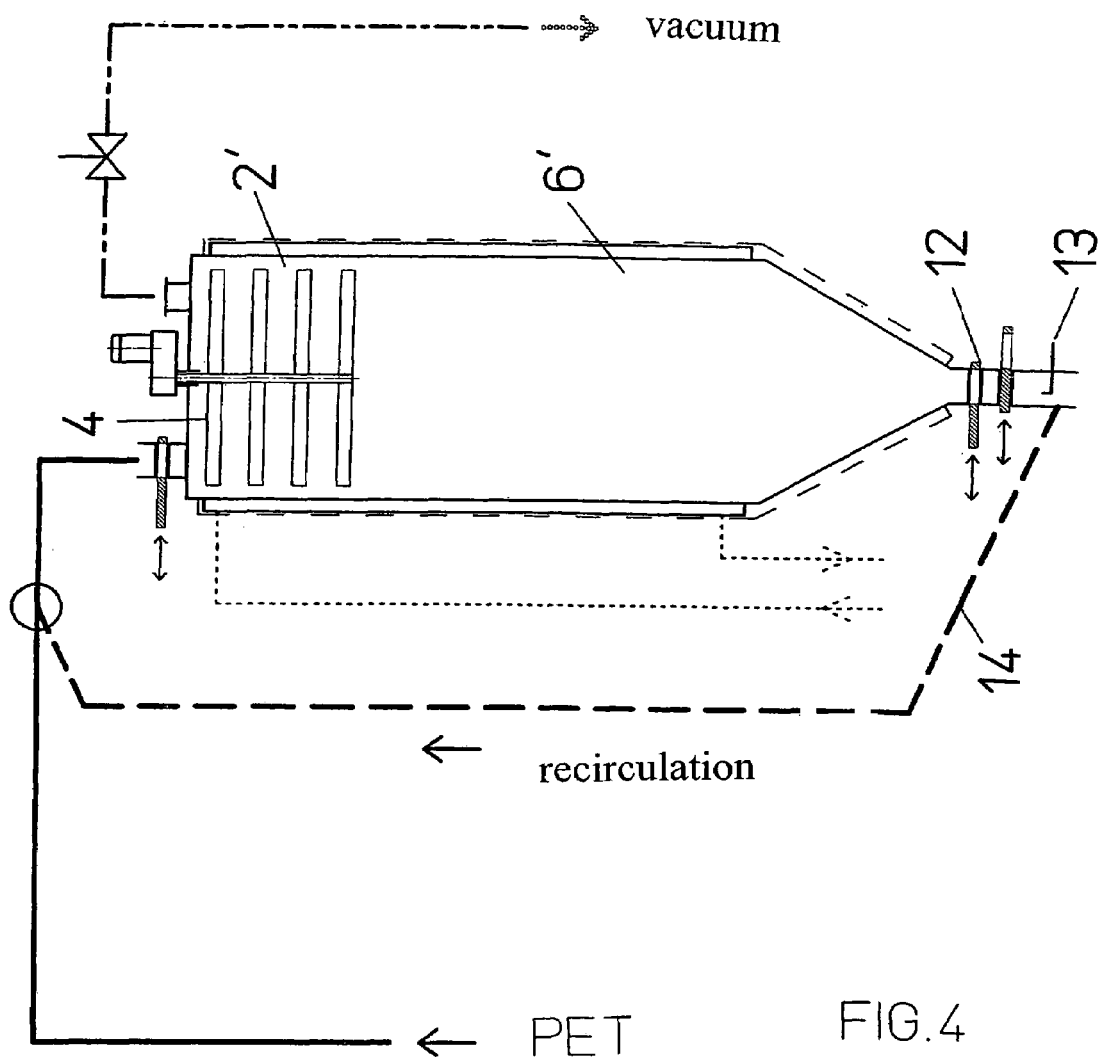

FIG. 4 finally shows a particularly simple embodiment of the invention producible at low cost, wherein the preheating container 2' comprising the agitator 4 is integral with the upper section of the heat treatment container 6'. Furthermore, a temperature sensor 13 for measuring the temperature of the polyester material and a conduit 14 for returning the polyester material to the preheating container 2' are provided at the outlet of the heat treatment container 6', whereby the polyester-material discharge stream is returned to the return conduit if the temperature is too low. Thus, in the starting phase of the device or after a longer standstill because of which the polyester material located in the heat treatment container drops below the heat treatment temperature, it can be omitted to completely empty the heat treatment container and to extrude the discharged material and to reintroduce it into the treatment process, but rather the polyester material is recycled until it reaches the required temperature at the outlet, whereby in this case it has also received the necessary residence time.

The invention claimed is:

1. A device for increasing the intrinsic viscosity of a polyester material by solid-state polymerization via a heat treatment comprising a heat treatment container, wherein the heat treatment container is preceded by a preheating container including an agitator adapted to heat the polyester material to at least a heat treatment temperature of the heat treatment container, and a vacuum source for subjecting the heat treatment container and the preheating container to a vacuum of between 0.1 and 10 mbar.

2. A device according to claim 1, wherein the preheating container is connected with the heat treatment container via a slide.

3. A device according to claim 1, wherein the heat treatment container is provided with wall heating or is an unheated container with heat insulation.

4. A device according to claim 1, wherein the preheating container is integral with the entrance area of the heat treatment container.

5. A device according to claim 1, wherein a temperature sensor for measuring the temperature of the polyester material and a conduit for returning the polyester material to the preheating container or the inlet of the heat treatment container are provided at the outlet of the heat treatment container, with the polyester-material discharge stream being redirectable into the return conduit depending on its measured temperature.

6. A device according to claim 1, wherein it exhibits a plurality of preheating containers comprising downstream heat treatment containers or one preheating container comprising a plurality of downstream heat treatment containers.

7. A device according to claim 1, wherein the preheating container is preceded by a granulation unit for the polyester material.

8. A device according to claim 1, wherein an extruder or a melt-processing device, for example an injection-molding machine, is arranged downstream of the heat treatment container.

9. A process for increasing the intrinsic viscosity of a polyester material by solid-state polymerization at a heat treatment temperature in a heat treatment container, the process comprising
heating the polyester material in a preheating container with a heated agitator under a vacuum between 0.1 and 10 mbar to a temperature not less than the heat treatment temperature,
thereafter transferring the preheated polyester material from the preheating container to the heat treatment container, and
maintaining the heat treatment temperature and the vacuum between 0.1 and 10 mbar in the heat treatment container while the polyester material is in the heat-treated chamber.

10. A process according to claim 9 including providing the preheating container with a double wall defining a cavity, and conducting a heat-transfer medium through the cavity of the double wall.

11. A process according to claim 9 wherein transferring the preheated polyester material comprises delivering the heated polyester material from the preheating container to the heat treatment container in batches.

12. A process according to claim 9 wherein maintaining comprises maintaining a heat treatment temperature of at least 180° C.

13. A process according to claim 9 wherein maintaining the heat treatment temperature comprises heating the treatment container by heating a wall of the container.

14. A process according to claim 9 including constructing the preheating container integrally with an entrance air of the heat treatment container.

15. A process according to claim 9 wherein the heat treatment container has an outlet, and including measuring the temperature of the polyester material in the heat treatment container and returning the polyester material from the heat treatment container to one of the preheating container and an inlet of the heat treatment container when the measured temperature of the polyester material is insufficient.

16. A process according to claim 9 including supplying the polyester material to a plurality of preheating containers comprising downstream heat treatment containers or to one preheating container comprising a plurality of downstream heat treatment containers.

17. A process according to claim 9 including granulating the polyester material before heating the polyester material in the preheating container.

18. A process according to claim 9 including providing at least one of an extruder, a melt-processing device and an injection-molding machine, and delivering polyester material in its heated state from the heat treatment container to the one of the extruder, melt-processing device and injection-molding machine.

19. A device for increasing the intrinsic viscosity of a polyester material at a heat treatment temperature comprising a preheating container and a heated agitator adapted to heat the polymerization material to the heat treatment temperature and to maintain a vacuum between 0.1 and 10 mbar in the preheating container, and a heat treatment container formed for receiving the heated polymerization material from the preheating container and adapted to maintain a vacuum of between 0.1 and 10 mbar and the heat treatment temperature while the polymerization material is in the heat treatment container.

* * * * *